Dec. 25, 1951     P. F. M. SENDERS     2,579,706
CUTTING PLATE FOR DRY-SHAVING APPARATUS
Filed April 17, 1948     2 SHEETS—SHEET 1

INVENTOR.
PIETER FRANS MICHAEL SENDER
BY
AGENT.

Dec. 25, 1951    P. F. M. SENDERS    2,579,706
CUTTING PLATE FOR DRY-SHAVING APPARATUS
Filed April 17, 1948    2 SHEETS—SHEET 2

INVENTOR.
PIETER FRANS MICHAEL SENDERS.
BY
AGENT.

Patented Dec. 25, 1951

2,579,706

UNITED STATES PATENT OFFICE 2,579,706

CUTTING PLATE FOR DRY-SHAVING APPARATUS

Pieter Frans Michael Senders, Eindhoven, Netherlands, assignor to Hartford National Bank and Trust Company, Hartford, Conn., as trustee Application April 17, 1948, Serial No. 21,733
In the Netherlands May 7, 1947

6 Claims. (Cl. 30—43)

Cutting plates for dry-shaving apparatus are already known of the type comprising a number of lanes of travel with running surfaces for reciprocating cutting members and having shaving apertures preferably in the form of parallel slots. The lanes of travel are all located in the same place so that the cutters may be applied to the skin simultaneously and are thus capable of covering a large area in one movement. The speed of shaving is considered increased in that way.

In the known forms of construction the slotted apertures are provided in all lanes of travel in the same direction. Since it is known that the most satisfactory results in shaving are obtained if the cutting plate is moved over the skin in the same sense as the slots, the above-mentioned cutting plates of known type are dependent on the direction of movement with the consequence that, in order to obtain optimum results, the user of the apparatus is always under the necessity of giving due consideration to the preferential direction in shaving.

The object of the invention is to overcome this disadvantage, at least in part, and yet to profit of the known advantages afforded by construction comprising cutting plates which cooperate with reciprocating cutting members.

With this object in view, a cutting plate for a dry-shaving apparatus is provided according to the invention, which comprises a number of lanes of travel with running surfaces for reciprocating cutter members and shaving apertures preferably in form of parallel slots, wherein the lanes of travel are all located in the same plane, but are disposed in at least two different directions with respect to each other in such a manner that the angles between the center lines of the lanes are equal or substantially equal.

Consequently, the angles between the center lines of the slots in different lanes of travel are preferably also equal or substantially equal. Since the lanes may thus form a regular figure, there are already two preferential directions provided when using lanes extending in only two different directions. If, however, use is made of more than two different directions, the number of preferential directions increases accordingly and the user of the shaving apparatus becomes more and more independent from the direction of the sweep.

Although it may seem more difficult and more expensive to make such a cutting plate, manufacture becomes in reality quite simple when use is made of the electro-plating manufacturing method as described in the prior patent application Ser. No. 719,764, now abandoned, which method is particularly suitable for the purpose.

The invention will now be explained more fully with reference to the accompanying drawing, which shows by way of example, some few constructions of a cutting plate according to said invention and in which.

In the following descriptive part of the specification, the expression "lanes" will be used for lanes of travel of the cutter members.

Figure 1:
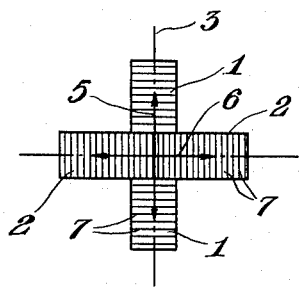
Figs. 1–6 are plan views showing diagrammatically a number of embodiments of cutting plates with different lanes in which the cutter elements are guided to travel.
Figure 12:
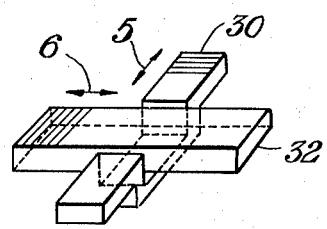
Fig. 12 is a perspective view of two cutters used with the cutting plate shown in Fig. 1.

Referring to Fig. 1, the cutting plate shown in plan comprises two lanes 1 and 2, which form a cross. The angles between the center lines 3 and 4 are in this case 90°. The direction of movement of the cutting members 30, 32 shown in Fig. 12 which move on a running surface provided by grinding at the bottom side of each of the lanes, is indicated by double-headed arrows 5 and 6. The slot-shaped shaving apertures 7 provided in the lanes are in this case at right angles to the center lines of the lanes but may be, if desired, at a smaller angle therewith. The cutter members in this as well as in the embodiments described hereinbelow with reference to Figs. 2–6, can be driven by mechanism explained with reference to Fig. 8.

Figure 2:
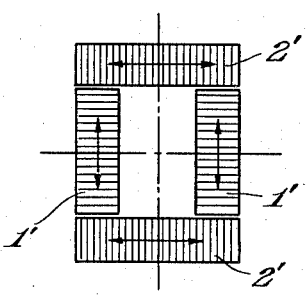
Figure 13:
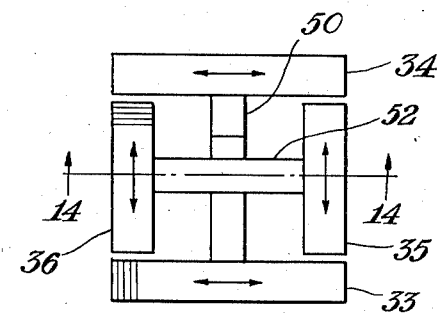
Fig. 13 is a plan view of two double cutters used with the cutting plate shown in Fig. 2.
Figure 14:
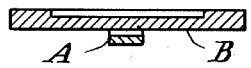
Fig. 14 is a cross section taken along line 14—14 of Fig. 13.

Fig. 2 shows four lanes, 1', 1', 2', 2' forming a square. As before, the direction of movement of the four cutting members 33, 34, 35, 36 shown in Figs. 13 and 14 are indicated by the double-headed arrows. Members 33 and 34 are connected to an arm 50 for movement in unison; members 35 and 36 are similarly connected by an arm 52.

Figure 3:
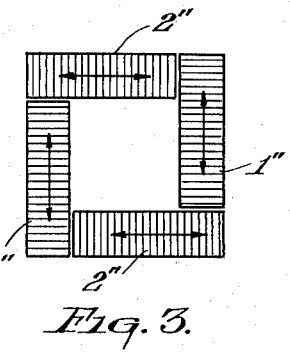

Fig. 3 shows a cutting plate of slightly different arrangement of lanes 1", 1", 2", 2" in a square.

Figure 4:
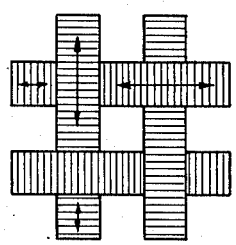
Figure 15:
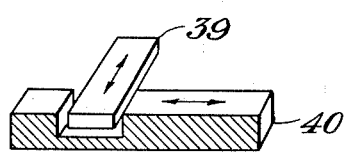
Fig. 15 is a perspective view of two of the cutter members used with the cutting plate shown in Fig. 4.

In Fig. 4 the lanes are in similar configuration as in Fig. 3, but they are overlapping, i. e. each lane is interrupted at the point at which the other lane intersects with it at right angles. Fig. 15 illustrates how the cutting members 39 and 40 are arranged for intersecting lanes. Only two cutter members to be used in combination with a cutting plate according to Fig. 4 have been shown so as to illustrate the position of the cutters at the crossing of lanes. The complete cutter arrangement may be built similarly to the one shown in Fig. 13 with pairs of cutter members parallel to each other, with each cutter overlapping another cutter as shown in Fig. 15. It should be noted that Fig. 15 is a perspective cross section of the cutter members.

Figure 5:
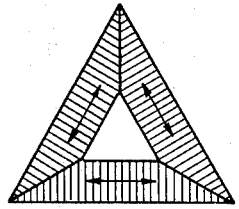
Figure 16:
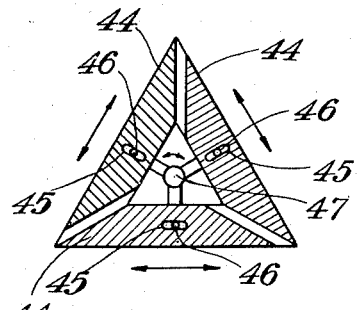
Fig. 16 shows three cutter members to be used with the plate illustrated in Fig. 5.

Fig. 5 is the illustration of a cutting plate with three lanes arranged in triangular forms. Fig. 16 shows the cutter arrangement therefor with three cutters 44 each having a slot 45 for engagement with a pin 46. A central spindle 47 is mounted for oscillating movement, for instance by means of a vibration motor to which the pins 46 are fixedly connected. Thus the oscillation of spindle 47 imparts a reciprocating motion to the cutters 44 in a known manner.

Figure 6:
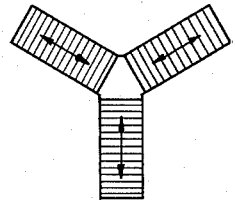
Figure 7:
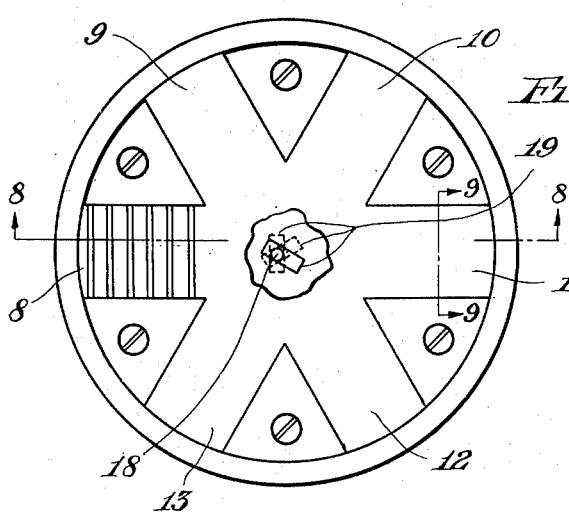
Fig. 7 is a top plan view, with the central portion broken away, of a further embodiment of a cutting plate according to the invention.

Fig. 6 shows a cutter plate having three lanes radially arranged at angles of 120°. Fig. 7 is a similar arrangement with six lanes. The arrangement for both embodiments including the drive means is more fully described with reference to Figs. 7–9.

In Fig. 7 the six lanes are designated by 8, 9, 10, 11, 12 and 13.

Figure 8:
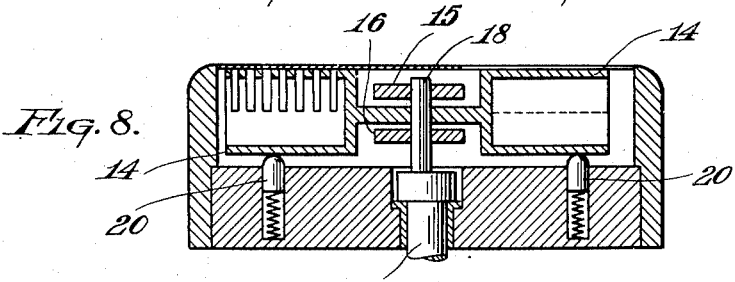
Fig. 8 is a cross section along line 8—8 of Fig. 7.
Figure 9:
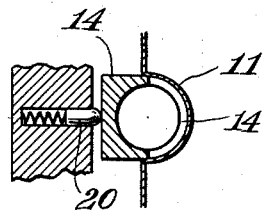
Fig. 9 is a cross section along line 9—9 of Fig. 7.

The lanes which are in line with one another, cooperate with common cutting members 14, 15, 16, each of which is driven by means of a pin 18 mounted eccentrically on the rotary driving-spindle 17. For this purpose the central portion of each cutting member has slot-shaped apertures 19, as shown in Fig. 7. In order to make this common drive possible, the parts of the cutting members 14 to 16 coupled to the driving pin 18 have stepped central portions which bridge one another in a crosswise manner as shown in Fig. 8.

By means of spring pins 20, the cutting members are urged in known manner on to the running surfaces provided at the inside of the lanes 8 to 13.

Figure 10:
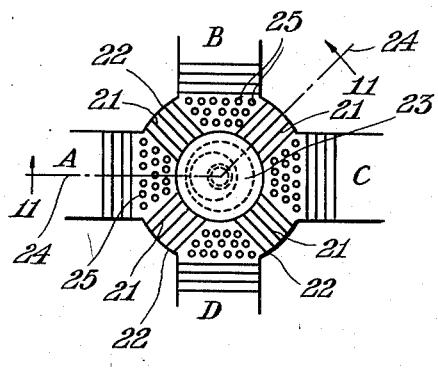
Fig. 10 is a showing of another embodiment of the cutting plate.
Figure 11:
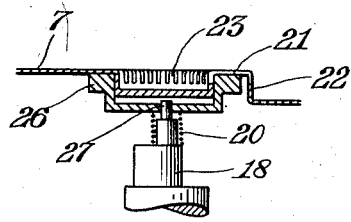
Fig. 11 is a cross section along line 11—11 of Fig. 10.

Figures 10 and 11 show yet another embodiment of the cutter plate in which use is made of a free space in the central portion of the plate to obtain additional shaving action.

In a cross-shaped construction four lanes A, B, C, D are arranged as shown in Fig. 10. The central portion comprises four groups of parallel slots 21 at an angle with lanes A–D and issuing on the one hand, at the outer edge 22 and merging, on the other hand into a central reentrant part 23. Between the slots 21 provision is made of small apertures 25 so as to ensure a combined shaving effect. The central portion comprises a rotary cutting member 26 which is driven by means of a pin 27 eccentrically mounted on spindle 18. The four cross-shaped cutting lanes A–D cooperate with two cutters which may be operated as shown in Fig. 8.

What I claim is:

1. In a dry shaving apparatus of the type comprising a shaver head mounted in a housing, cutter members associated with said head and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different directions with respect to each other in such a manner that the angles between the center lines of the lanes are substantially equal.

2. In a dry shaving apparatus of the type comprising a shaver head mounted in a housing, cutter members associated with said head, and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different radial directions with respect to each other in such a manner that the angles between the center lines of the lanes are substantially equal.

3. In a dry shaving apparatus of the type comprising a shaver head mounted in a housing, cutter members associated with said head and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different directions with respect to each other in such a manner that the angles between the center lines of the lanes are substantially equal, said cutting plate having a central portion provided with shaving slots and with a running surface, a cutter member adapted to be moved through said running surface, and driving means for operating said cutter member along said running surface.

4. In a dry shaving apparatus of the type comprising a shaver head mounted in a housing, cutter members associated with said head, and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different radial directions with respect to each other in such a manner that the angles between the center lines of the lanes are substantially equal, said cutting plate having a central portion provided with shaving slots and with a running surface, a cutter member adapted to be moved through said running surface, and driving means for operating said cutter member along said running surface.

5. In a dry shaving apparatus of the type comprising a shaver head mounted in a housing, cutter members associated with said head and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different directions with respect to each other in such a manner that the angles between the center lines of the lanes are substantially equal, a common driving spindle for actuating said cutter members, said cutter members having stepped portions arranged to bridge each other.

6. In a dry shaving apparatus of the type comprising a shaver head mounted in a housing, cutter members associated with said head, and an operating motor in said housing for driving the cutter members of said shaver head in reciprocating movement, in combination a cutting plate for cooperation with said cutter members, said plate having shaving apertures in the form of parallel slots and comprising a plurality of lanes of travel forming running surfaces for said cutter members, said lanes being all located in the same plane in at least two different radial directions with respect to each other in such a manner that the angles between the center lines of the lanes are substantially equal, a common driving spindle for actuating said cutter members, said cutter members having stepped central portions arranged to bridge each other and slots therein for receiving said driving spindle.

PIETER FRANS MICHAEL SENDERS.

REFERENCES CITED

The following references are of record in the file of this patent:

UNITED STATES PATENTS

| Number | Name | Date |
|---|---|---|
| 2,350,805 | Olving | June 6, 1944 |